United States Patent [19]

Guenther

[11] 4,455,730

[45] Jun. 26, 1984

[54] TURBINE BLADE EXTRACTOR

[75] Inventor: Paul Guenther, Aston, Pa.

[73] Assignee: Westinghouse Electric Corp., Pittsburgh, Pa.

[21] Appl. No.: 413,208

[22] Filed: Aug. 30, 1982

[51] Int. Cl.³ ............................................. B23P 19/04
[52] U.S. Cl. ..................................................... 29/252
[58] Field of Search ..................... 29/251, 252, 426.4;
225/103; 83/633, 634

[56] References Cited

U.S. PATENT DOCUMENTS

| | | | |
|---|---|---|---|
| 1,420,424 | 6/1922 | Hullett | 29/252 |
| 2,101,434 | 12/1937 | Johnston | 225/103 |
| 2,572,137 | 10/1951 | Grieder | 83/633 |
| 2,768,429 | 10/1956 | Willis | 29/426.4 |
| 3,390,446 | 7/1968 | Ettorre | 29/252 |
| 4,141,124 | 2/1979 | Ryan | 29/252 |
| 4,293,991 | 10/1981 | Bailey | 29/252 |
| 4,360,136 | 11/1982 | Bates | 29/426.4 |

FOREIGN PATENT DOCUMENTS 59458 3/1912 Switzerland ......................... 29/251

*Primary Examiner*—Robert C. Watson
*Attorney, Agent, or Firm*—F. J. Baehr, Jr.

[57] ABSTRACT

An axial flow compressor blade extractor utilizing a pair of hydraulic C clamps to position a plunger so that it is aligned with the blade root and a hydraulic cylinder and rocker arm for transmitting a force to the plunger to shear the pin which affixes the blade to the blade groove and moves the blade therein.

5 Claims, 4 Drawing Figures

4,455,730

TURBINE BLADE EXTRACTOR

BACKGROUND OF THE INVENTION

This invention relates to apparatus for removing blades from a turbine and more particularly to removing compressor blades from the rotor of the axial flow compressor connected to a gas turbine.

Several devices have been utilized to remove compressor blades, which are affixed by a pin in an axially oriented groove disposed in a radial array in a blade disc. One such device is a one inch diameter brass bar twelve to sixteen inches long, which is placed against the root of the compressor blade and struck with a hammer in order to shear the spring loaded pin and drive the blade from the groove. Pneumatic hammers and hydraulic cylinders reacting against adjacent blade rings have also been utilized, but were not completely satisfactory.

SUMMARY OF THE INVENTION

In general, apparatus for removing blades affixed in generally axially oriented grooves by pins from an axial flow machine having multiple rows of blades, when made in accordance with this invention, comprises a base portion, which fits between adjacent rows of blades, a plunger slidably disposed in the base portion so as to be axially aligned with the grooves and means for applying force to the plunger sufficient to shear one of the pins and move one of the blades in one of the grooves. The apparatus also comprises means for clamping the base adjacent one of the blades and for resisting the reactive forces on the base when force is applied to the plunger.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
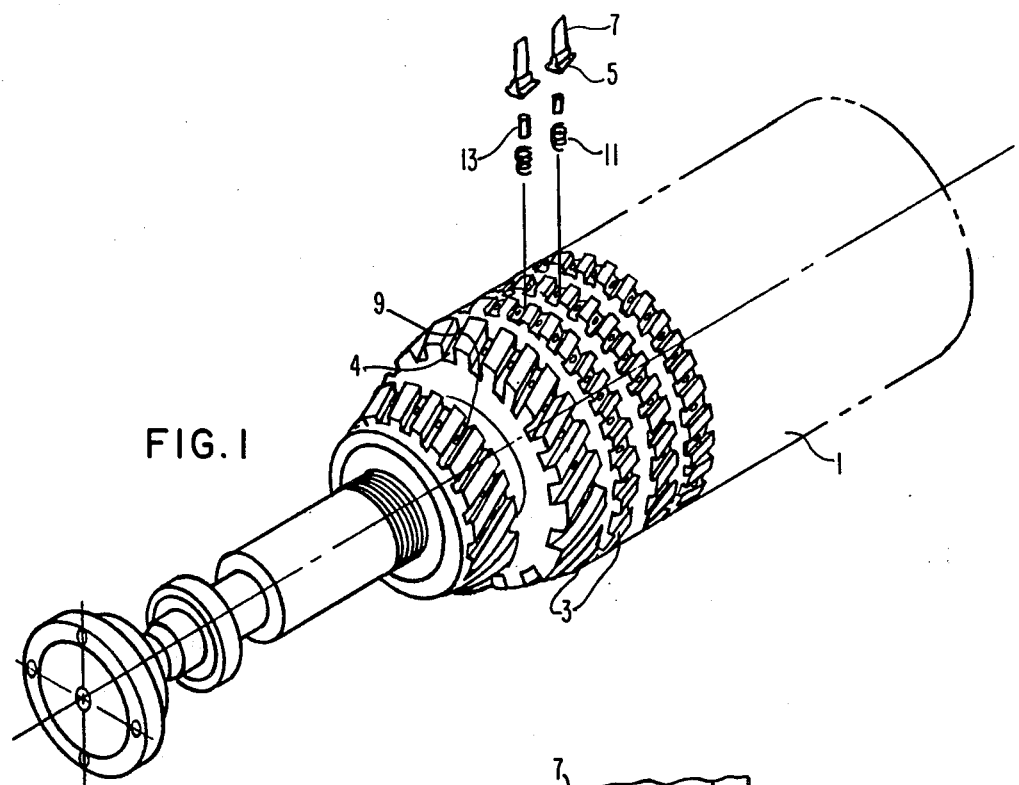
FIG. 1 is a perspective view of a portion of a turbine rotor showing how the blades are affixed thereto.

Referring now to the drawings in detail and in particular to FIG. 1 there is shown a portion of a compressor rotor 1 for a gas turbine. The rotor 1 has a plurality of discs 3 with generally axially aligned or side entry grooves 4 into which root portions 5 of compressor blades 7 fit. The bottom of the grooves 4 are drilled to form a hole 9 which houses a spring 11 and pin 13. The bottom portion of the root 5 also has a hole 15 which receives generally one half of the pin in order to affix the blades 7 to the discs 3.

The blades 7 are easily installed by depressing the pins 13 and sliding the blade root 5 into the groove 4 and as the hole 15 in the root becomes aligned with the pin 13 it springs into the hole 15 locking the blades 7 in place in the grooves 4.

Figure 2:
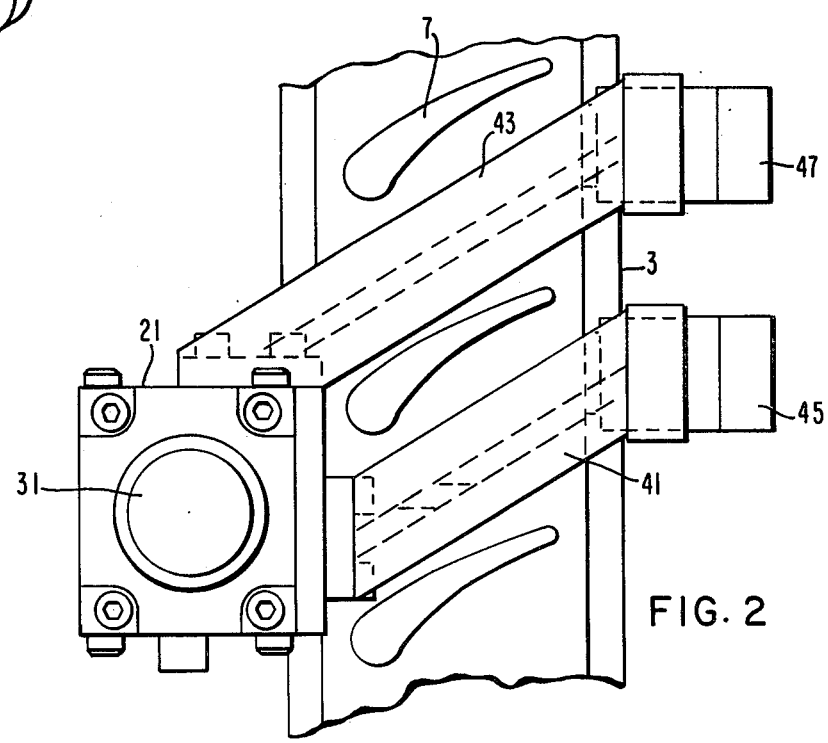
FIG. 2 is a plan view of a blade extracting apparatus disposed adjacent a blade.
Figure 3:
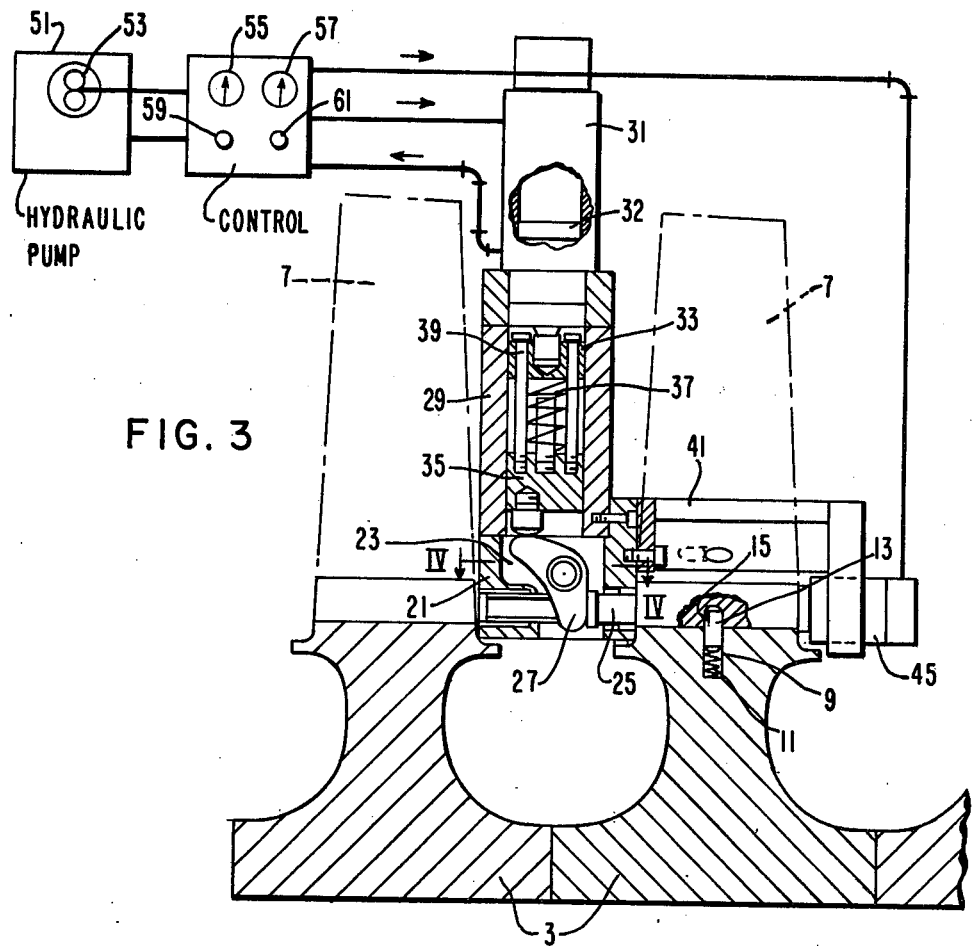
FIG. 3 is a sectional view of the apparatus and blades.
Figure 4:
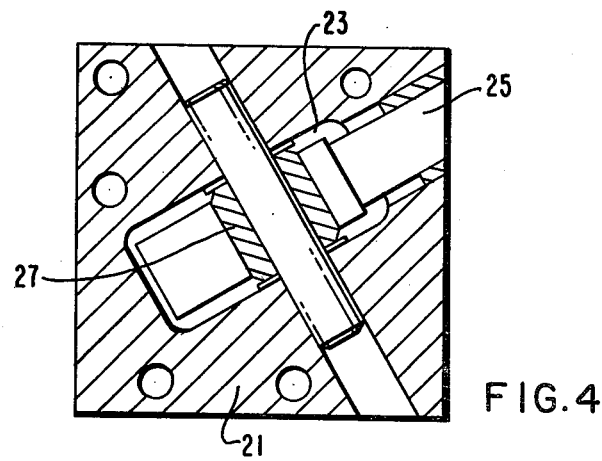
FIG. 4 is a sectional view taken on line IV—IV of FIG. 3.

To remove the blades 7 the pins 13 must be sheared. Apparatus for extracting a blade 7 and shearing the pin 13 is shown in FIGS. 2 through 4 and comprises a base portion 21, which fits between adjacent disc 3 and which has a centrally disposed opening 23 disposed therein. A plunger 25 is slidably disposed in the base portion 21 and is in communication with the central opening 23. A rocker arm 27 is pivotally disposed within the opening 23 in the base portion 21 so that one end thereof contacts the plunger 25. Attached to the base 21 is a housing or sleeve 29 on which a hydraulic cylinder 31 having a piston 32 is mounted. Disposed between the hydraulic cylinder 31 and the rocker arm 27 are a pair of anvils 33 and 35 separated by a spring 37 are other biasing means and held together by shoulder bolts 39 are other fasteners. The anvils 33 and 35 and springs 37 transmit the motion and forces produced by the hydraulic piston 32 to the other end of the rocker arm 27.

Also fastened to the base 21 are a pair of generally C-shaped brackets 41 and 43 which straddle a disc 3 and fit between blades 7 adjacent to the one being removed. Hydraulic cylinders 45 and 47 are mounted in the brackets opposite the base and when activated provide a clamping force to hold the base 21 against the disc 3 and resist the force applied by the plunger 25 to the root portion of the blades 7 to shear the pin 13 and push the blade 7 partially from the groove 4.

A hydraulic system is shown in FIG. 3 and has a reservoir 51 and pump 53 which supply pressurized hydraulic fluid to the hydraulic cylinders 31, 45 and 47. Pressure gages 55 and 57 and valves 59 and 61 respectively indicate the pressure of the fluid being supplied to the hydraulic cylinders and control the flow thereto. While the hydraulic cylinder 31 is shown as a double acting cylinder and the hydraulic cylinders 45 and 47 are shown as single acting it is understood that either single or double acting hydraulic cylinders would serve equally well in either application.

The blade extractor herebefore described advantageously fits between discs and spacing between blades to safely shear retaining pins and slide the blades in the blade grooves without damaging the discs.

What is claimed is:

1. Apparatus for removing blades affixed in a generally axially oriented groove by a pin from a rotor of an axial flow machine having multiple rows of blades, said apparatus comprising:

a base portion which fits between adjacent rows of blades;

a plunger slidably disposed in said base portion so as to be axially aligned with said groove;

means for applying a force to said plunger sufficient to shear one of said pins and move one of said blades in one of said grooves;

said means for applying a force comprising a hydraulic cylinder, a rocker arm pivotally mounted in the base portion, one end thereof contacting the plunger and the other end receiving the force from the hydraulic cylinder, and a spring interposed between the hydraulic cylinder and the rocker arm; and means for clamping said base adjacent one of said blades and for resisting the reactive forces on said base when force is applied to said plunger.

2. Apparatus as set forth in claim 1, wherein the cylinder is disposed at right angle with respect to the plunger.

3. Apparatus as set forth in claim 1, wherein the clamping and force resisting means comprises at least one hydraulic cylinder disposed in a member cooperating with the base to form a C-shaped bracket.

4. Apparatus as set forth in claim 1, wherein the clamping and force resisting means comprises a pair of hydraulic cylinders disposed in a pair of members cooperating with the base to form a pair of C-shaped brackets, which contact the rotor on opposite sides of the groove.

5. Apparatus as set forth in claim 4, wherein the pair of hydraulic cylinders fit between adjacent rows of blades.

* * * * *